(12) United States Patent
Marathe

(10) Patent No.: US 7,673,449 B2
(45) Date of Patent: Mar. 9, 2010

(54) TORUS SHAPES FOR TORQUE CONVERTERS

(75) Inventor: Bhaskar Marathe, Copley, OH (US)

(73) Assignee: LuK Lamellen und Kapplungsbau Beteiligungs KG, Buehl (DE)

( * ) Notice: Subject to any disclaimer, the term of this patent is extended or adjusted under 35 U.S.C. 154(b) by 255 days.

(21) Appl. No.: 11/786,603

(22) Filed: Apr. 12, 2007

(65) Prior Publication Data
US 2007/0240953 A1 Oct. 18, 2007

Related U.S. Application Data

(60) Provisional application No. 60/791,844, filed on Apr. 13, 2006.

(51) Int. Cl.
*F16H 41/26* (2006.01)
*F16H 45/02* (2006.01)

(52) U.S. Cl. .......................... 60/365; 60/330

(58) Field of Classification Search ............ 60/338, 60/362, 364, 365, 366
See application file for complete search history.

(56) References Cited

U.S. PATENT DOCUMENTS

| | | | |
|---|---|---|---|
| 1,199,360 A | | 9/1916 | Föttinger |
| 2,630,682 A | * | 3/1953 | Kronner et al. ............... 60/362 |
| 2,737,827 A | | 3/1956 | Seybold |
| 2,952,976 A | * | 9/1960 | Alexandrescu ............... 60/366 |
| 3,167,918 A | * | 2/1965 | Alexandrescu ............... 60/366 |
| 3,785,154 A | * | 1/1974 | Malik .......................... 60/366 |
| 3,965,680 A | * | 6/1976 | Cottrell et al. ................ 60/367 |
| 4,129,000 A | | 12/1978 | Umeda et al. |
| 5,860,500 A | * | 1/1999 | Olsen et al. ................. 192/3.29 |
| 2004/0118113 A1 | * | 6/2004 | Fukunaga et al. ............. 60/345 |
| 2005/0241901 A1 | * | 11/2005 | Joo et al. .................... 192/3.29 |
| 2006/0185955 A1 | | 8/2006 | Fukunaga et al. |

FOREIGN PATENT DOCUMENTS

| | | | |
|---|---|---|---|
| DE | 221422 | | 4/1910 |
| DE | 238804 | | 9/1911 |
| DE | 10081340 | | 8/2001 |
| FR | 2 867 249 | | 9/2005 |
| GB | 953351 | * | 3/1964 |
| JP | 03-35359 U | * | 4/1991 |
| WO | WO 0068598 A1 | * | 11/2000 |

\* cited by examiner

*Primary Examiner*—Thomas E Lazo
(74) *Attorney, Agent, or Firm*—Simpson & Simpson, PLLC

(57) ABSTRACT

A torque converter in which the inner turbine output diameter or the inner pump input diameter is smaller than the inner stator passage diameter.

14 Claims, 5 Drawing Sheets

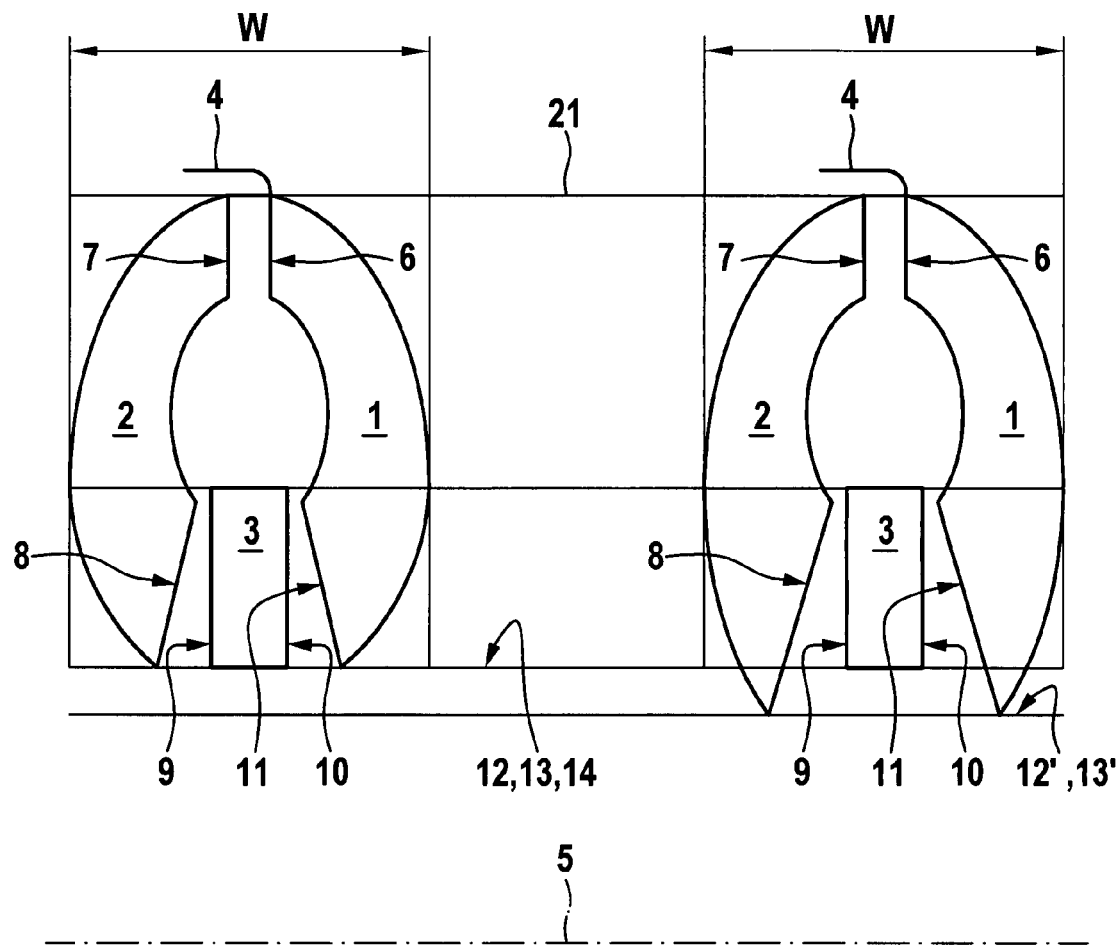

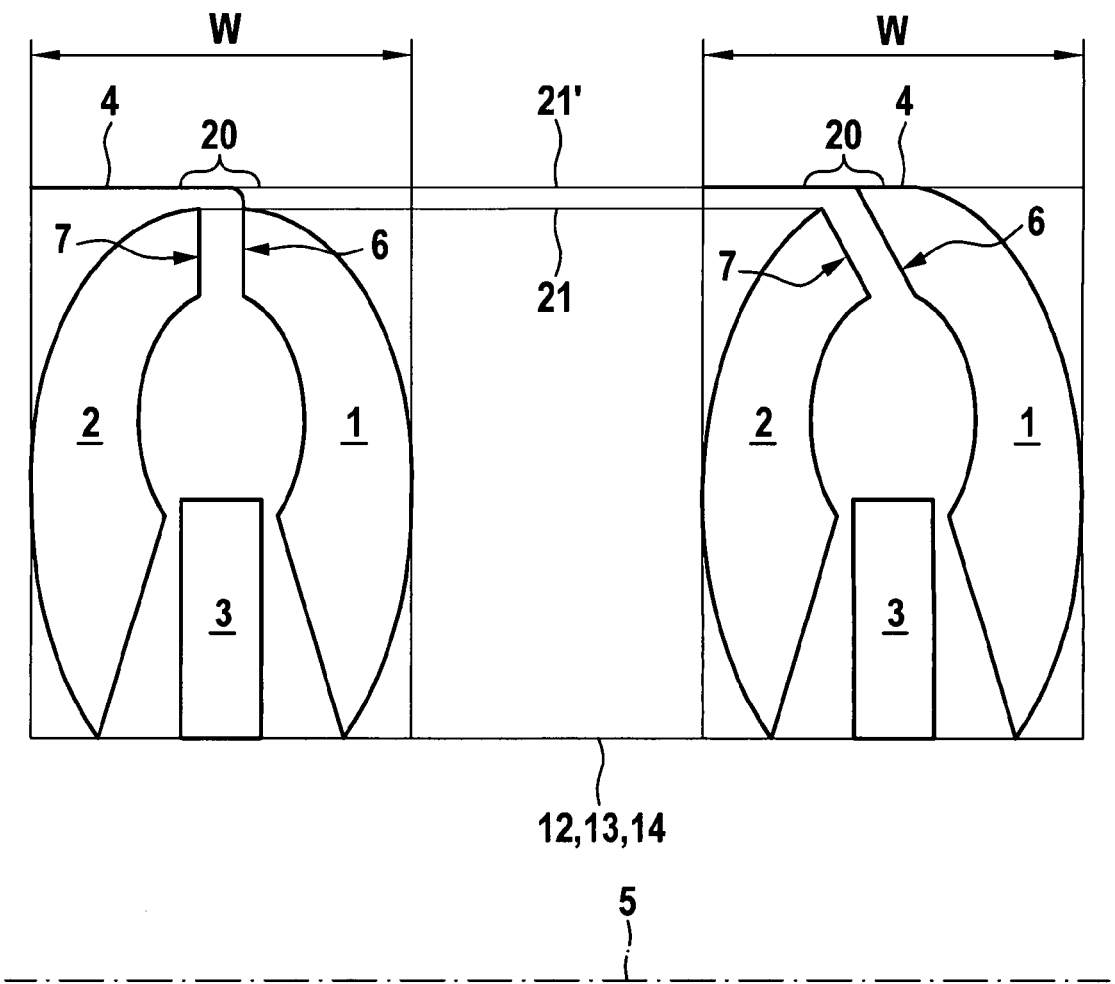

TORUS SHAPES FOR TORQUE CONVERTERS

CROSS REFERENCE TO RELATED APPLICATIONS

This application claims the benefit under 35 U.S.C. §119 (e) of U.S. Provisional Application No. 60/791,844, filed Apr. 13, 2006, which application is incorporated herein by reference.

FIELD OF THE INVENTION

The invention relates to a torque converter, in particular, torque converter in which the inner turbine output diameter or the inner pump input diameter is smaller than the inner stator passage diameter.

BACKGROUND OF THE INVENTION

Torque converters have been known since 1905 (DE 22 14 22 and DE 23 88 04). The inventor, Föttinger, installed a pump and a turbine between two halves of a shell which were joined together in a fluid-tight connection after assembly. In a further refinement of the invention, a stator is also positioned. In the pump, the turbine and the stator there are vanes that extend essentially radially. Filling the housing with a fluid, preferably oil, brings about a transfer of force and torque from the pump to the turbine. The introduction of force into the torque converter in a motor vehicle occurs by having the housing of the converter attached to the crankshaft of a combustion engine in a rotationally fixed connection. The output takes place through the turbine, with the transmission input shaft of the subsequent transmission being connected, directly or indirectly, to the hub of the turbine in a rotationally fixed connection.

Through the rotation of the housing, and hence of the pump, the oil is thrown outward by the effect of centrifugal force. The oil flows in an arc within the pump. In the radially outer area of the pump the oil stream is diverted in the axial direction and then flows into the turbine. The power that the oil must deliver slows the oil flow, so that the flow cross section in the turbine must expand increasingly in the direction of flow. Since the oil must be directed again to the inflow area of the pump, the outer wall of the turbine is curved toward the inflow area of the pump. Before the stream of oil coming from the turbine can again reach the inflow openings of the pump, the oil also flows through the stator. The stream of oil undergoes another change of direction in the stator, so that the flow against the pump vanes is optimized maximally. The oil circulation can then begin again. As long as the circulation is maintained, and as long as the turbine rotates at a lower speed than the pump, torque can be transmitted. However, the closer the turbine speed approaches the pump speed, the poorer the efficiency becomes.

The pump, the turbine and the stator together form the torus of a torque converter. The corresponding flow is then a toroidal flow. The concept is derived from mathematics, since the rotating ring of oil at the same time rotates around the rotational axis of the torque converter with its axis offset.

Since the invention of the torque converter, additional important components have been invented and added to the torque converter. The bridging clutch, for example, represents an important improvement, since it can be actuated when efficiency is low. As a result, the power flows, directly or indirectly, into the transmission shaft. Another known improvement provides for a torsion vibration damper, called a damper for short, to be installed in the power path, so that inconsistencies in the rotation of the crankshaft do not reach the transmission input shaft.

Also, many shapes for the torus have been invented in the last hundred years, in order to improve the efficiency of the torque converter. But in recent years a standard shape has evolved for the motor vehicle, which has now been adapted essentially only to the power requirement and to the possibilities for installation in the transmission.

BRIEF SUMMARY OF THE INVENTION

The object of the invention was therefore to search for possibilities which improve the efficiency of the torus.

In one embodiment of the invention, lengthening the outlet, or output, openings of the turbine in the direction of the rotational axis of the torque converter while retaining the dimensions of the flow-through openings of the stator results in an improvement in the efficiency. This result was unexpected. That is, according to the knowledge available in the art at the time, there was no expectation that the improvement would occur. This improvement occurs even if the inflow openings of the pump are lengthened in the direction of the rotational axis of the torque converter. The two measures can also be combined. A simulation by means of a special program, computational fluid dynamics (CFD), found an efficiency improvement of 2 to 3 percent for the two combined measures.

According to the state of the art, in the radially outer area of the torus an outflow of the oil from the pump occurs that is substantially parallel to the axis of rotation of the torque converter. This is important so that an axial flow against the turbine can again occur. Because the shell in which the vanes of the turbine are located must be at a distance from the housing of the torque converter so that no contact with the housing occurs, and because the outer flow surface in the pump is formed by the housing itself, a ring-shaped step must be stamped into the housing at the transition from the pump to the turbine, so that the outer diameter of the pump is at the level of the outer diameter of the turbine. However as a result, the outside diameter of the pump is always somewhat smaller than the adjacent diameter of the converter. Since the fifth power of the diameter of the pump enters into the formula for the efficiency and the output of a torque converter, it is desirable to maximize the diameter of the pump. According to another embodiment of the invention, a form of the housing, and hence of the torus, is proposed without a step. The shape of the housing is described in further detail below in connection with the description of the figures.

In another embodiment of the invention the torus shape varies from the state of the art in such a manner that it undergoes shearing. This shearing is to be understood in that shearing is explained in the theory of strength of materials, except that when shaping the torus it is not any shear stresses that are of significance, but merely the deformation itself. For further clarification we here refer to the description of the figures given below.

In another embodiment of the invention, the stator is designed as a diffuser. This means that the cross section between the vanes of the stator expands from the inflow opening in the direction of the outflow opening. This causes the oil to be retarded in the stator. Since the expansion cannot be extensive, and because otherwise adjacent intermediate spaces (which are formed by the neighboring vanes) would have to be smaller, the expansion occurs in the radial direction. CFD simulations have shown that the reduction of the static pressure in the pump results in more power from the torque converter. To achieve a reduction of the static pressure in the pump, the flow of oil in the pump must be accelerated from the inlet opening to the outlet opening, for example, making the input opening of the pump larger than the output opening of the pump. In the state of the art these two openings are the same. To prepare the flow of oil for the flow cross section of the pump before it enters the pump, the stator is designed as a diffuser.

In a final embodiment of the invention, the torus is shaped so that the toroidal flow is almost circular. This is achieved by making the inside diameter of the stator, i.e., the diameter of the stator hub, 0.5 to 0.7 times the outside diameter of the pump.

BRIEF DESCRIPTION OF THE DRAWINGS

The nature and mode of operation of the present invention will now be more fully described in the following detailed description of the invention taken with the accompanying drawing figures, in which:

FIG. 1 is a partial cross-sectional view of a torus according to the state of the art;

FIG. 2 is a partial cross-sectional view of a present invention torus with outflow and inflow openings of the turbine or pump lengthened in the direction of the axis of rotation in comparison to FIG. 1;

FIG. 3 is a partial cross-sectional view of a torus according to the state of the art;

FIG. 4 is a partial cross-sectional view of a present invention torus with enlarged pump diameter in comparison to FIG. 3;

DETAILED DESCRIPTION OF THE INVENTION

Figure 5:
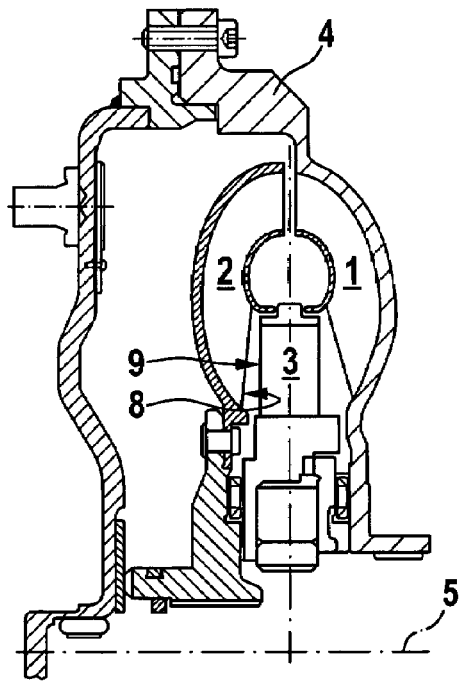
FIG. 5 is a partial cross-sectional view of a torus according to the state of the art.

It should be explained in advance that reference labels which are not mentioned in the descriptive portion are to be taken from the list of reference labels. Equivalent reference labels represent an equivalent element. At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

FIG. 2 is best viewed in light of FIG. 1, because the differences are well illustrated by comparing FIG. 2 with FIG. 1, state of the art. The cross section through the torus shown in the figures consists essentially of a pump 1, a turbine 2 and a stator 3. The outer contour of the pump 1 is formed by the housing 4. The torus rotates around an axis of rotation 5, which is identical to the axis of rotation of the crankshaft of a combustion engine. Through the cross-sectional depiction it is also possible to simultaneously see the outlines of the vanes positioned in pump 1, turbine 2 and stator 3. The vanes are curved in space, but that cannot be recognized here due to the two-dimensional depiction.

The vanes of turbine 2 are arranged in a shell of the turbine, which simultaneously represents the outer contour of the turbine vanes. The curved inner contours of pump 1 and of turbine 2 are also covered according to the state of the art by a shell, known as the inner ring. This configuration guides the toroidal oil flow between the outer shells, the inner shells and the vanes. In FIG. 1, the inner diameters 12, 13, 14 of turbine 2, stator 3 and pump 1 are all at the same level.

In FIG. 2, an embodiment according to the invention, the radially inner ends of turbine outlet, or output, opening 8 and of pump inflow opening 11 have been placed further inside from diameter 12. However, stator 3 remains unchanged in its dimensions of the inlet and outlet openings 9, 10. Although the inner diameters 12', 13' of turbine 2 and pump 1 are smaller than that of stator 3, the result, according to a CFD simulation, is nevertheless an improvement in efficiency.

In another embodiment of a torus according to FIG. 4, the outer diameter 21 of pump 1 in FIG. 3 has been enlarged to a greater diameter 21'. FIG. 3 shows the state of the art for comparison. In FIG. 3, a step is located in the housing 4 of the converter in a transition zone 20, and the outer diameter of turbine 2 corresponds to that of pump 1. The enlarged pump outer diameter 21' became possible because opening 20 (for the outflow of the oil from pump 1 into turbine 2) is located at approximately an 11 o'clock position in comparison to the 12 o'clock position shown for opening 20 in FIG. 3. However, since the fifth power of the pump diameter enters as a positive figure into the formula for the efficiency and the output, the larger pump diameter 21' represents a clear improvement in output and efficiency. In patent specification DE 22 14 22 FIG. 6, in patent specification U.S. Pat. No. 1,199,360 FIG. 8, and on page 265 of the monograph "Vehicle Transmissions" from the year 1994 by the authors Lechner and Naunheimer, respective toruses are shown with respective separation lines between pump output opening 6 and turbine input opening 7 at about the 11 o'clock position. However, an overall oval housing is indicated in these references, so that oil exiting from pump 1 necessarily must flow into the turbine, unlike the configuration of the present invention embodiment. The above references also fail to specify the nature of the housing. For example, these references do not teach an enlarged pump outer diameter 21'.

Figure 6:
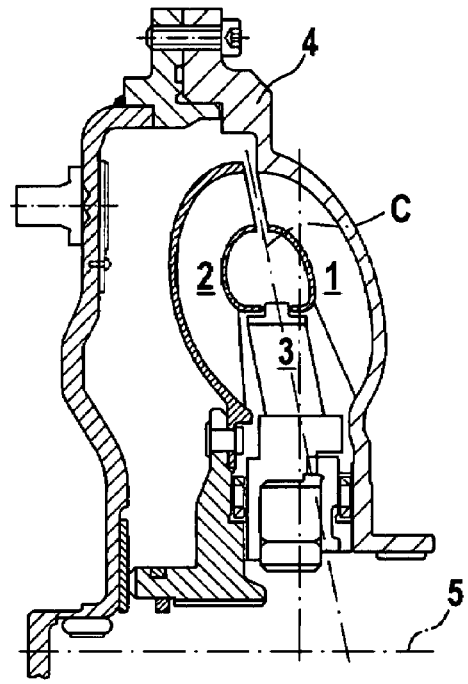
FIG. 6 is a partial cross-sectional view of a present invention torus that is sheared on the turbine side in comparison to FIG. 5.
Figure 7:
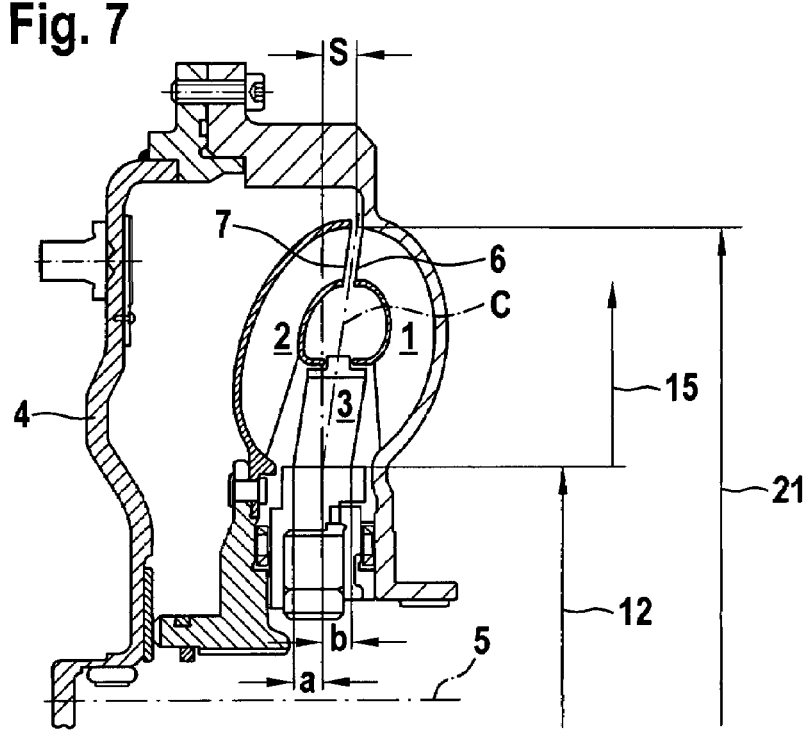
FIG. 7 is a partial cross-sectional view of a present invention torus that is sheared on the pump side in comparison to FIG. 5.

FIGS. 6 and 7 show another embodiment of the invention, with FIG. 5 showing the state of the art. The housings are portrayed more realistically here than in the earlier figures, but the indicated axial connecting technology in the radially outer area is atypical for series products. The illustrated connecting technology is used in the experimental realm, to enable installed parts of the converter to be exchanged faster and more easily. In the case of series products, the left and right housing shells are welded together at the circumference. To clarify the presentation, the converter bridging clutch and torsion vibration damper components are intentionally not shown in these figures.

According to the invention, the torus is sheared in each case in FIGS. 6 and 7. In FIG. 6 there is shearing in the direction of turbine 2. In FIG. 7 the torus is sheared in the direction of the pump. To prevent misunderstandings, it should be emphasized that the examples in FIGS. 6 and 7 do not show a tilted torus. If the torus were tilted instead of sheared, then for example the lowest point of FIG. 5 (state of the art) between turbine output opening 8 and stator input opening 9 in FIG. 6 would be lower than the intersection of the vertical dashed-dotted line and the center line C. In FIG. 7 the vertical line is positioned in the center of the inner stator outlet, or output, diameter 14. This is illustrated by the intervals a, b, which are both the same size. If one imagines an infinite number of assumed axial sections through the torus, and if they are shifted with an increasing effective radius 15, increasing axially in the direction of the pump, a sheared torus results. At the level of the pump outer diameter 21, the value S represents the total magnitude of the shearing.

The shearing has the advantage that in FIG. 6 there is more space in the radially inner area for installed parts, for example for a torsion vibration damper, and at the same time the total length of the converter becomes shorter compared to the existing art. The maximum available axial construction space is increasingly a problem for designers. With the shearing according to FIG. 7, space has been created in the radially outer area. This construction space can be used specifically for a damper, since a damper effects a larger spring deflection with increasing effective diameter.

From the state of the art (DE 10081340 T 1 FIG. 14 and U.S. Pat. No. 4,129,000 FIG. 1), torus forms are known that look similar to the present invention, but either no parallelism of the pump output opening 6 to the turbine input opening 7 is revealed there, or the parallelism does in fact exist but this transition point is of radial form and not sheared.

If pump output opening 6 and turbine input opening 7 are not parallel, efficiency is lost. The decisive advantage of this inventive embodiment is that the torus form can be produced through axial shaping processes. This is especially advantageous in the case of the stator 3, which according to the state of the art is produced by aluminum die casting, because costly slide tools are made superfluous by the axial shaping employed there.

Figure 8:
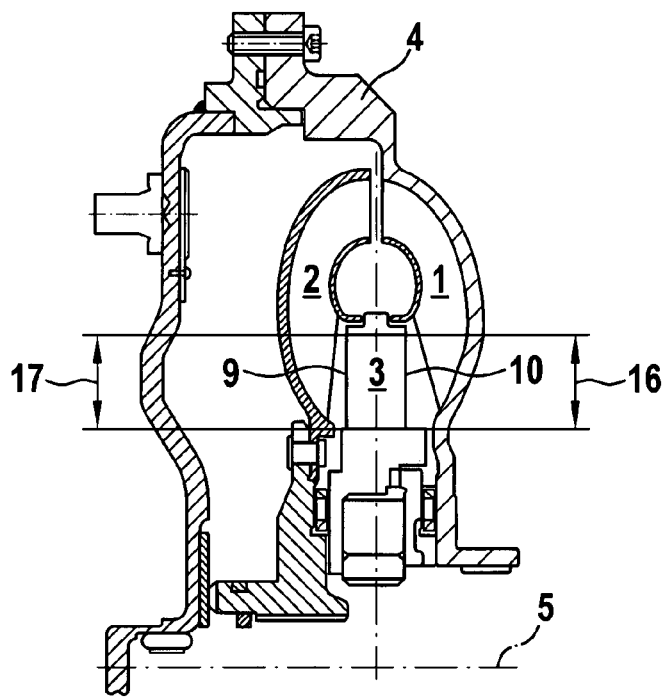
FIG. 8 is a partial cross-sectional view of a torus according to the state of the art.
Figure 9:
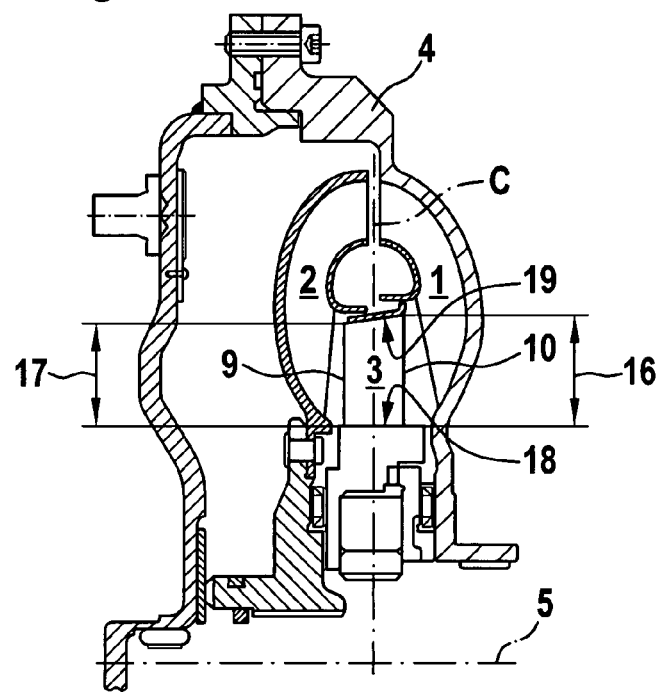
FIG. 9 is a partial cross-sectional view of a present invention torus with a diffuser stator in comparison to FIG. 8.

FIG. 9 show an additional invention, with FIG. 8 showing the state of the art. In this embodiment of the invention, stator 3 is provided with a diffuser effect; i.e., the oil is retarded as it flows through. This is achieved by having the stator output openings 10 designed longer than the stator input openings 9. Since an expansion of the cross section between the vanes is not permitted in the circumferential direction, and since then the cross sections between the adjacent vanes would be reduced, the cross section is expanded in the radial direction. For that reason the input height 17 is smaller than the output height 16. This design has the advantage that when the stator 3 is produced by means of die casting it is possible to use axial deformation. The expansion can be accomplished either by having only the outer ring-shaped boundary surface 19 open radially outwardly, by having only the inner radial boundary surface 18 open radially inwardly (not shown), or by combining the preceding radial openings (not shown). As already explained earlier, the design of stator 3 as a diffuser also has hydrokinetic benefits. In another embodiment of the diffuser, the outer ring—which is provided on the inside with the outer ring-shaped boundary surface 19—can be designed as a separate ring. This ring can then be pressed onto the outer diameter of the stator vanes by pressing. In additional embodiments this ring can also be secured on the stator vanes by means of a step, a groove, or by staking.

From the state of the art, for example in patent specification U.S. Pat. No. 2,737,827, a converter is known that also has a diffuser-type stator. However, the converter depicted there is a converter that has more than three torus sections. In the claimed invention on the other hand, there are a maximum of only the three torus sections, namely pump, turbine and stator. In addition, in the state of the art the stator cannot be produced by means of an axial deformation, because this results in an undercut due to the curvature in the radially outer area of the inflow end. It would not be possible then to pull a core out to the right.

Figure 10:
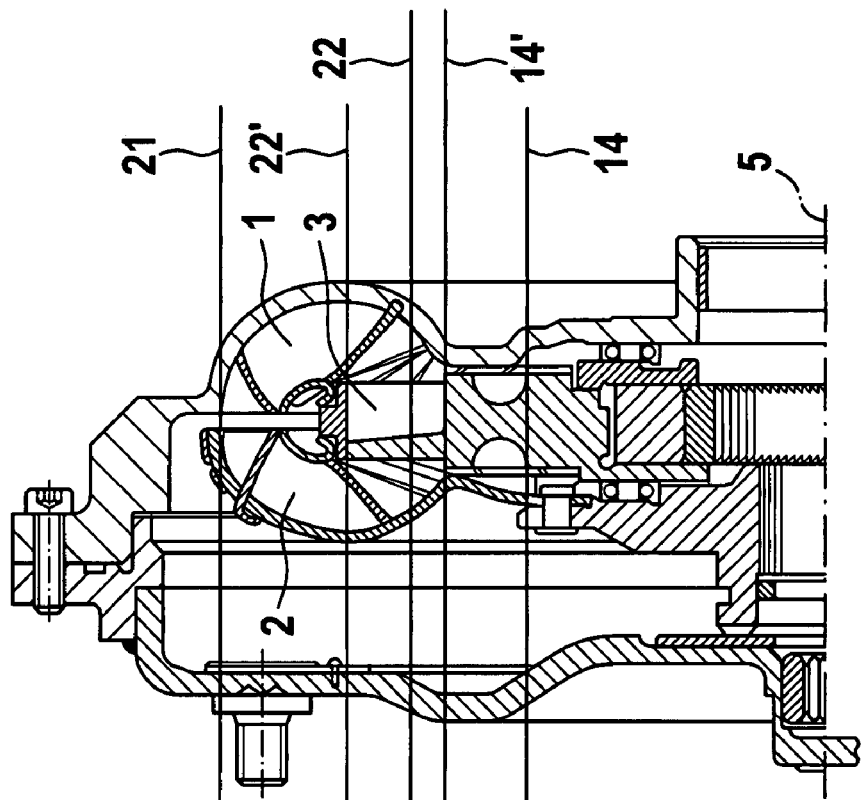
FIG. 10 is a partial cross-sectional view of a torus according to the state of the art; and, FIG. 11 is a partial cross-sectional view of a present invention torus with a nearly circular cross section.
Figure 11:
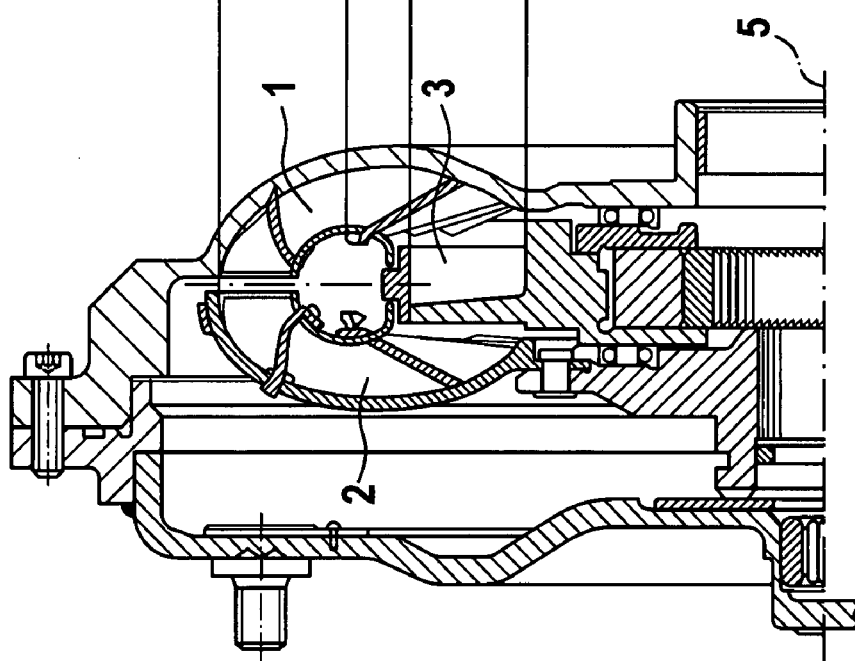

FIG. 11 shows an embodiment of the invention, with FIG. 10 showing the state of the art for direct comparison. The shaded narrow areas in pump 1, turbine 2 and stator 3 come about because the vanes are also drawn in here, and they are also cut in part by the sectional plane. The horizontal lines are intended for better comparison of the construction sizes. It is conspicuous that stator 3 in FIG. 11 has been pushed into the torus to a certain extent. The formerly oval torus of FIG. 10 has become an almost circular torus in FIG. 11. The inside stator diameter 14 is shifted radially to the stator diameter 14'. In the same way, the outer stator diameter 22 is shifted radially outward to the outer stator diameter 22'. The inner stator passage diameter 14' is preferably 0.5 to 0.7 times the outer diameter 21 of the pump.

Converter output data are typically depicted in a diagram of "MP 2000 (Nm)" over "speed ratio." Here "MP 2000" is the input torque of the pump in Newton meters at 2000 revolutions per minute. The "speed ratio" is the ratio of the rotational speed of the turbine to the rotational speed of the pump. Since the rotational speed of the turbine without a converter bridging clutch is always lower than the rotational speed of the pump, with a disengaged converter bridging clutch this value is also always less than 1. In such a diagram (not shown) for the present invention of FIG. 11, the pump torques for small speed ratios (<0.5) are lower than the values for the existing art. This is especially beneficial when a combustion engine is first to be disengaged in its lower speed range, i.e., is not yet to be loaded to the full extent by driving power. This is especially important for diesel engines.

The present invention performs differently however at an upper speed ratio (>0.5). Here the pump torques are greater than those of the state of the art. This is also advantageous if the efficiency worsens as the speed ratio approaches 1 (or 0.8, the possible clutch point), but the turbine power can nevertheless be increased in this speed range by the invention. The turbine power is the power that is ultimately forwarded to the transmission.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCE NUMBERS 1 pump
2 turbine
3 stator
4 housing
5 axis of rotation
6 pump output opening
7 turbine input opening
8 turbine output opening
9 stator input opening
10 stator output opening
11 pump input opening
12 inside turbine output diameter
12' reduced inside turbine output diameter
13 inside pump input diameter
13' reduced inside pump input diameter
14 inside stator passage diameter
15 effective radius
16 output height on the output side of the stator
17 input height on the input side of the stator
18 inner ring-shaped boundary surface
19 outer ring-shaped boundary surface
20 transition area
21 pump outside diameter
21' enlarged pump outside diameter
22 outside stator passage diameter
22' outside stator passage diameter
W axial width of the torus
S shearing
C center line
a separation
b separation

What is claimed is:

1. A torque converter for a motor vehicle, comprising a housing and a pump located therein, a turbine, a stator, and a bridging clutch, wherein the pump, the turbine and the stator together form a torus, wherein both an inner turbine output diameter and an inner pump input diameter are smaller than an inner stator passage diameter and wherein a difference between an outer stator passage diameter and the inner stator passage diameter is at least 20 percent of an outer diameter for the turbine.

2. The torque converter of claim 1, wherein the inner turbine output diameter and the inner pump input diameter are smaller than the inner stator passage diameter.

3. The torque converter of claim 1, wherein a torus shape is sheared such that imagined axial sections through the torus shape, staffing from the inner stator passage diameter, are shifted increasingly axially in one direction as an effective radius increases.

4. The torque converter of claim 3, wherein the shearing is linear such that over a running variable of effective radius a quotient of the axial shift to a difference in the effective radius is constant.

5. The torque converter of claim 3, wherein the torus shape is sheared in the direction of the turbine.

6. The torque converter of claim 3, wherein the torus shape is sheared in the direction of the pump.

7. The torque converter of claim 1, wherein the stator comprises respective pluralities of output openings and input openings and wherein an output height at the plurality of output openings of the stator is greater than the input height at the plurality of input openings of the stator.

8. The torque converter of claim 7, wherein a diameter of an inner, ring-shaped boundary surface at the plurality of output openings of the stator is smaller than a diameter of the inner ring-shaped boundary surface at the plurality of input openings of the stator.

9. The torque converter of claim 7, wherein a diameter of an outer, ring-shaped boundary surface at the plurality of output openings of the stator is larger than a diameter of the outer ring-shaped boundary surface at the plurality of input openings of the stator.

10. The torque converter of claim 9, wherein the stator further comprises a plurality of vanes and wherein the outer ring-shaped boundary surface is designed as a separate ring slidable onto an outer diameter of the plurality of vanes.

11. The torque converter of claim 10, wherein the separate ring is fixed on the plurality of vanes by one of a step, a groove, and staking.

12. The torque converter of claim 1, wherein the pump comprises a plurality of output openings, the turbine comprises a plurality of input openings, and the plurality of output openings of the pump form a cone-shaped figure such that an outer rim of the pump extends further toward the turbine than an inner diameter of the pump, and so that the plurality of input openings of the turbine are essentially parallel to the plurality of output openings of the pump, where a diameter for a portion of the housing radially aligned with a transition area from the pump to the turbine is uniform.

13. The torque converter of claim 1, wherein the inner stator passage diameter is 0.5 to 0.7 times an outer diameter of the pump.

14. The torque converter of claim 1, further comprising at least one torsional vibration damper.

* * * * *